United States Patent
Takanashi et al.

(10) Patent No.: US 7,315,907 B2
(45) Date of Patent: Jan. 1, 2008

(54) INFORMATION DELIVERY AND DISPLAY SYSTEM AND INFORMATION DELIVERY METHOD

(75) Inventors: Makoto Takanashi, Tokyo (JP); Toshiyuki Amaya, Saitama (JP); Kazuhiro Miyamoto, Tokyo (JP); Hiroaki Mise, Tokyo (JP)

(73) Assignee: Pioneer Corporation, Tokyo (JP)

( * ) Notice: Subject to any disclaimer, the term of this patent is extended or adjusted under 35 U.S.C. 154(b) by 323 days.

(21) Appl. No.: 11/028,242

(22) Filed: Jan. 4, 2005

(65) Prior Publication Data

US 2005/0160168 A1    Jul. 21, 2005

(30) Foreign Application Priority Data

Jan. 16, 2004    (JP)    ............................. 2004-009272

(51) Int. Cl.
     *G06F 3/00*    (2006.01)
(52) U.S. Cl. .................... 710/46; 710/109; 709/224
(58) Field of Classification Search ............ 710/15–19, 710/36–46, 107–109; 709/223–226
     See application file for complete search history.

(56) References Cited

U.S. PATENT DOCUMENTS 6,449,663 B1*    9/2002    Carney et al. ................ 710/15
6,615,161 B1*    9/2003    Carney et al. ............... 702/186
6,880,027 B1*    4/2005    Oguro ........................ 710/107
2005/0198576 A1*    9/2005    Childress et al. ........... 715/736
2005/0210128 A1*    9/2005    Cannon et al. .............. 709/224
2006/0192997 A1*    8/2006    Matsumoto et al. ....... 358/1.15
2006/0212750 A1*    9/2006    Denninghoff et al. .......... 714/6

FOREIGN PATENT DOCUMENTS

JP    1-192239 A    8/1989

* cited by examiner

*Primary Examiner*—Christopher Shin
(74) *Attorney, Agent, or Firm*—Foley & Lardner LLP

(57) ABSTRACT

An information delivery and display system includes one or more information display devices that play display information, and a monitoring/control server that sends information to the information display device when the information display device carries out polling at predetermined time intervals. The monitoring/control server includes a control instruction unit that creates control instruction information to change a polling interval of the information display device and that sends the created control instruction information to the information display device when the information display device carries out polling.

11 Claims, 14 Drawing Sheets

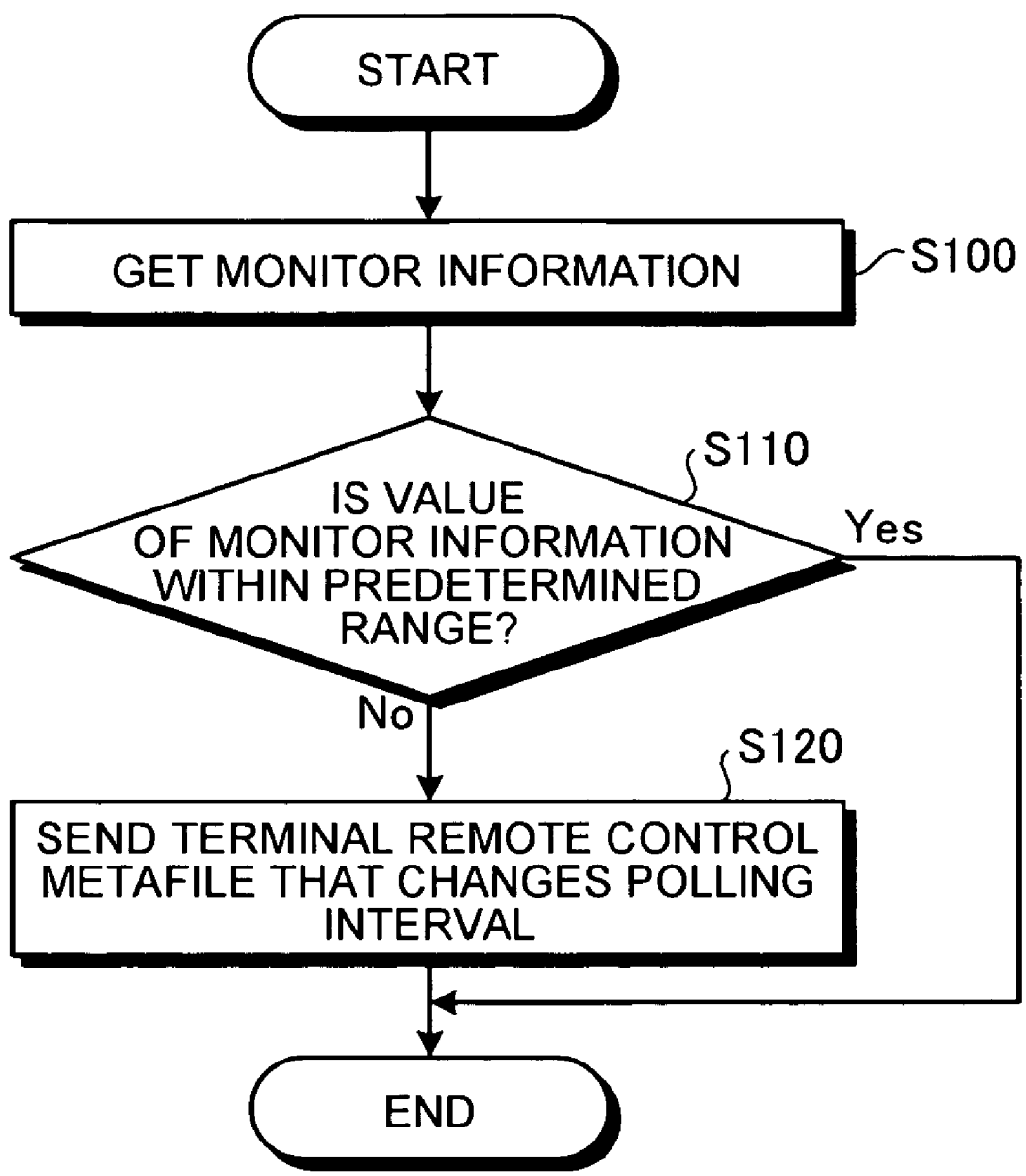

FIG.11

TERMINAL CONTROL METAFILE

| CATEGORY | ELEMENT NO. | DESCRIPTION |
|---|---|---|
| BASIC INFORMATION | 0 | LANGUAGE TYPE |
| | 1 | METAFILE CREATION DATE |
| | 2 | METAFILE LOADING COMPLETION NOTIFYING URL |
| PACKAGE START INFORMATION (MAY CONTAIN PLURALITY OF RECORDS) | 0 | PACKAGE START DATE |
| | 1 | SWITCHING PROPERTIES (WAIT OR NOT UNTIL CURRENT PROGRAM IS OVER, MENU-DRIVEN/AUTO-PLAYBACK) |
| | 2 | PACKAGE ID |
| LOG CONTROL INFORMATION | 0 | GET LOG REQUEST |
| TERMINAL INFORMATION | 0 | TERMINAL INFORMATION METAFILE REQUEST ID |
| | 1 | TERMINAL INFORMATION METAFILE DESTINATION URL |
| TERMINAL REMOTE CONTROL INFORMATION | 0 | TERMINAL REMOTE CONTROL METAFILE REQUEST ID |
| | 1 | TERMINAL REMOTE CONTROL METAFILE RECEIVER URL |
| | 2 | TERMINAL REMOTE CONTROL METAFILE CHECKSUM |

FIG.12

TERMINAL INFORMATION METAFILE

| CATEGORY | ELEMENT NO. | DESCRIPTION |
|---|---|---|
| BASIC INFORMATION | 0 | LANGUAGE TYPE |
| | 1 | METAFILE CREATION DATE |
| HARDWARE INFORMATION (MONITOR INFORMATION) | 0 | OS NAME |
| | 1 | CPU NAME |
| | 2 | CPU CLOCK FREQUENCY |
| | 3 | TOTAL MEMORY SIZE |
| | 4 | TOTAL HDD CAPACITY |
| | 5 | FREE HDD CAPACITY |
| | 6 | VIDEO CARD NAME |
| | 7 | RESOLUTION (x x y z BIT) |
| | 8 | SOUND CARD NAME |
| | 9 | MONITOR NAME (TEMPERATURE) |
| | 10 | PERIPHERAL DEVICE (PORT NO., DEVICE NAME) |
| | 11 | CONTROL APPLICATION NAME |
| | 12 | DISPLAY APPLICATION NAME |
| | 13 | CPU LOAD RATIO |
| SETTINGS INFORMATION | 0 | PACKAGE REQUEST URL |
| | 1 | TERMINAL CONTROL METAFILE REQUEST URL |
| | 2 | INFORMATION DELIVERY LOG URL |
| | 3 | PROGRAM PLAYBACK LOG URL |
| | 4 | PACKAGE REQUEST POLLING INTERVAL (SECONDS) |
| | 5 | TERMINAL CONTROL METAFILE POLLING INTERVAL (SECONDS) |
| | 6 | DOWNLOAD RETRY INTERVAL (SECONDS) |
| | 7 | NO. OF DOWNLOAD RETRIES |
| | 8 | NO. OF THREADS TO BE DOWNLOADED AT ONE TIME |
| | 9 | LOG FILE SENDING INTERVAL (SECONDS) |
| | 10 | SNTP CORRECTED PERIOD (SECONDS) |
| | 11 | SNTP IMPLEMENTING SERVER |
| | 12 | TIMEOUT FOR IDLE MENU |
| | 13 | APPLICATION UPDATION VERIFICATION URL |
| | 14 | DEFAULT PROGRAM VERIFICATION URL |
| MISCELLANEOUS INFORMATION | 0 | TERMINAL START UP DATE (DAY, MONTH, YEAR, HOUR MINUTE, SECOND, AND GEOGRAPHICAL ZONE) |

FIG.13

TERMINAL REMOTE CONTROL METAFILE

| CATEGORY | ELEMENT NO. | DESCRIPTION |
|---|---|---|
| BASIC INFORMATION | 0 | LANGUAGE TYPE |
| | 1 | METAFILE CREATION DATE |
| SETTINGS INFORMATION | 0 | PACKAGE REQUEST URL |
| | 1 | TERMINAL CONTROL METAFILE REQUEST URL |
| | 2 | INFORMATION DELIVERY LOG URL |
| | 3 | PROGRAM PLAYBACK LOG URL |
| | 4 | PACKAGE REQUEST POLLING INTERVAL (SECONDS) |
| | 5 | TERMINAL CONTROL METAFILE POLLING INTERVAL (SECONDS) |
| | 6 | DOWNLOAD RETRY INTERVAL (SECONDS) |
| | 7 | NO. OF DOWNLOAD RETRIES |
| | 8 | NO. OF THREADS TO BE DOWNLOADED AT ONE TIME |
| | 9 | LOG FILE SENDING INTERVAL (SECONDS) |
| | 10 | SNTP CORRECTED PERIOD (SECONDS) |
| | 11 | SNTP IMPLEMENTING SERVER |
| | 12 | TIMEOUT FOR IDLE MENU |
| | 13 | APPLICATION UPDATION VERIFICATION URL |
| | 14 | DEFAULT PROGRAM VERIFICATION URL |
| CONTROL INFORMATION | 0 | REBOOT TERMINAL (AFTER N SECONDS) |
| | 1 | SHUTDOWN TERMINAL (AFTER N SECONDS) |

INFORMATION DELIVERY AND DISPLAY SYSTEM AND INFORMATION DELIVERY METHOD

BACKGROUND OF THE INVENTION

1) Field of the Invention

The present invention relates to an information delivery and display system and an information delivery method.

2) Description of the Related Art

There has been an increase in the number of information delivery systems that display information such as electronic advertisements via a server on terminal devices with display features (hereinafter, "display terminal devices"). In such information delivery systems, however, it is necessary for the server to control or monitor the display terminal devices remotely.

In the conventional information delivery systems, remote control or remote-monitoring is carried out by the server sending to the terminal devices a control instruction and a monitor instruction by push connection rather than by the terminal devices actively fetching the control instruction and the monitor instruction from the server.

Further, there exists a method for checking for communication of information between the server and the display terminal device that involves determining by polling whether any event has occurred either from the server to the display terminal device or vice versa.

In the polling method disclosed in Japanese Patent Laid-Open Publication No. H1-192239, a polling timer is provided at each node connected to a mobile unit and polling is carried out from a key station to the mobile unit when the polling timer is timed out. The polling timer can be set according to the processing speed of each mobile unit, thus making it possible to schedule polling tailored to the mobile unit.

However, in the remote control and remote-monitoring of the display terminal device using the push connection, it is mandatory for the display terminal device to have a global internet provider (IP) in order for the server to send the control instruction and the monitor instruction to the display terminal device. Further, in the push connection, the server often uses a special port number to send the control instruction and the monitor instruction to the display terminal device, thus necessitating special firewall settings on the display terminal device. Again, in the push connection, the display terminal device must have a predetermined free port for receiving the control instruction and the monitor instruction from the server, thereby raising security issues.

Moreover, though it is possible in the conventional technology to set the polling timer according to the processing speed of the mobile unit, it is not possible to change the polling interval according to the status of the device to which information is delivered (the mobile unit) or the content of the information delivered.

SUMMARY OF THE INVENTION

It is an object of the present invention to at least solve the problems in the conventional technology.

An information delivery and display system according to an aspect of the present invention includes an information display device that plays display information; and an information delivery server that sends information to the information display device when the information display device carries out polling at a predetermined time interval. The information delivery server includes a control instruction unit that creates control instruction information to change a polling interval of the information display device based on a content of the display information to be displayed by the information display device or a status of the information display device, and that sends the control instruction information to the information display device when the information display device carries out polling.

An information delivery and display system according to another aspect of the present invention includes an information display device that plays display information; and an information delivery server that sends information to the information display device when the information display device carries out polling at a predetermined time interval. The information delivery server causes a change in the polling interval of the information display device based on a load on the information delivery server. Moreover, the load depends on a number of remote information display devices and/or the polling interval of the remote information display devices.

An information delivery method according to still another aspect of the present invention is a method of sending information from an information delivery server to an information display device when the information display device carries out polling at a predetermined time interval. The information delivery method includes obtaining, by the information delivery server, information pertaining to a content of display information to be displayed by the information display device or a status of the information display device; creating, by the information delivery server, control instruction information to change a polling interval of the information display device based on the information pertaining to the content of the display information to be displayed by the information display device or the status of the information display device; and sending, by the information delivery server, the created control instruction information to the information display device when the information display device carries out polling.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 10 is a flow chart of a process of auto-adjustment of a polling interval based on monitor information, etc.;

FIG. 11 is a drawing of an example of the contents of a terminal control metafile;

FIG. 12 is a drawing of an example of the contents of a terminal information metafile;

FIG. 13 is a drawing of an example of the contents of a terminal remote control metafile;

DETAILED DESCRIPTION

Figure 1:
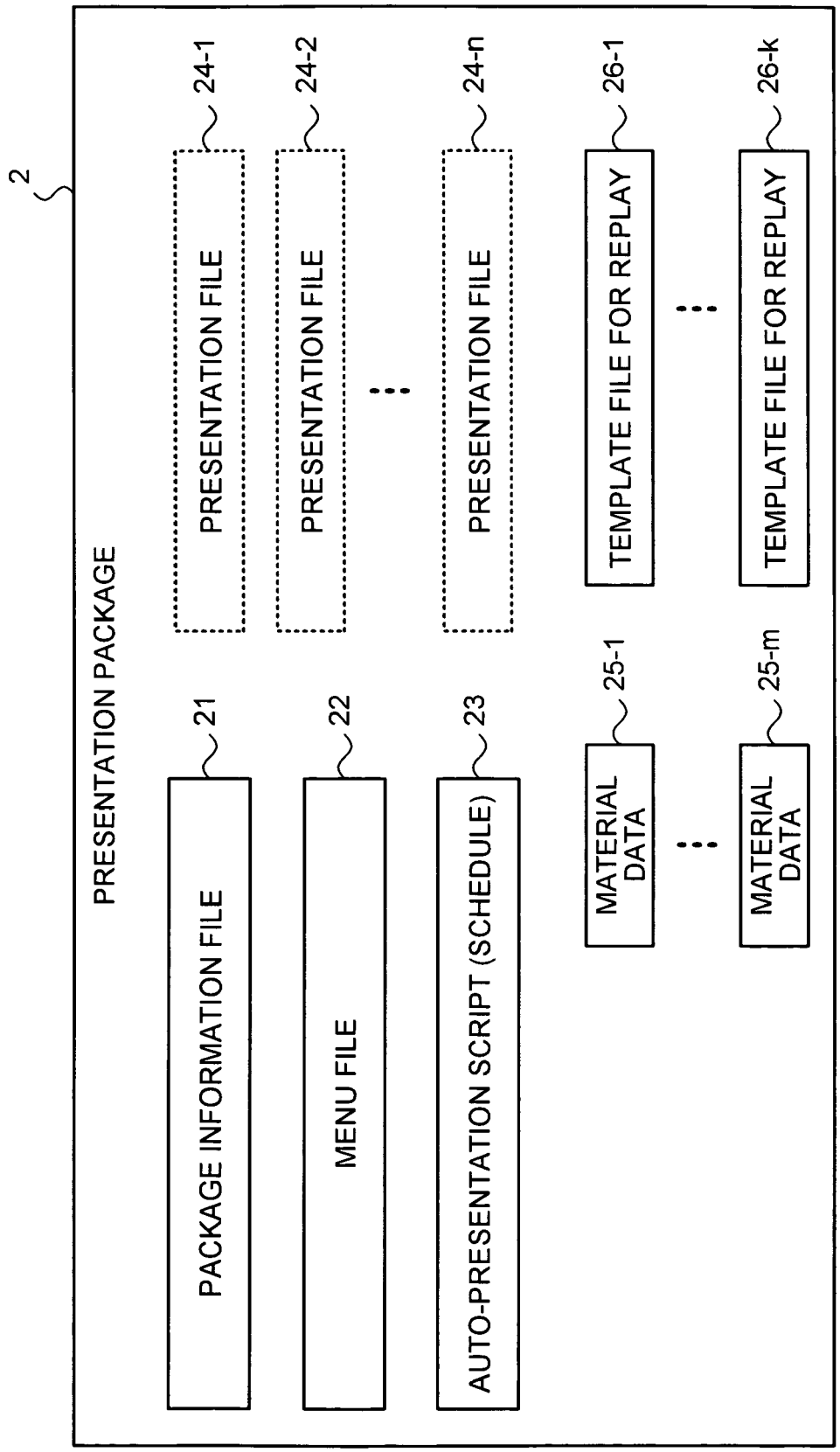
FIG. 1 is a drawing of a structure of a presentation package handled by an information delivery and display system.

Exemplary embodiments of an information delivery and display system and an information delivery method according to the present invention are explained next. The present invention is not limited to the disclosed embodiments. The information delivery and display system according to the present embodiment includes an information display device that displays the received information, a monitoring device that carries out remote-monitoring and remote control of the information display device with the aid of a system administrator, and a server that monitors and controls the information display device based on a monitor instruction and a control instruction issued by the monitoring device.

The monitoring and control of the information display device is carried out by fetching monitor information from the information display device and sending control information to the information display device. According to the present embodiment, the load on the server is reduced while carrying out monitoring or control of the information display device, and a predetermined polling interval is set for accessing the server from the information display device to fetch the monitor information and send the control information, thereby enhancing the security of the information delivery and display system.

The polling interval for accessing the server from the information display device affects the status of the information display device and the server. If the polling interval is short, the frequency of polling increases, increasing the load on the server and the information display device. Consequently, from the point of view of the load on the information display device, it is preferable to set a long polling interval. The system administrator should preferably carry out polling by accessing the server from the information display device at predetermined time intervals to get monitor information and send control information. The status of the information display device changes according to the contents of the information displayed on it.

Therefore, in the information delivery display system according to the present embodiment, the polling interval is automatically set according to the status of the information display device and the contents of the information displayed by the information display device. To set the polling interval automatically according to the contents of the information displayed by the information display device, if, for instance, the information displayed by the information display device is set for a long time, then the instruction information is sent to the information display device, which instructs the information display device to access the server at the polling interval (shortest polling interval) preferred by the system administrator. If the information displayed by the information display device is set for a short time, the instruction information is sent to the information display device instructing that the information display device should access the server at a shorter polling interval than that preferred by the system administrator and to carry out polling at a predetermined frequency.

To set the polling interval automatically according to the status of the information display device, the instruction information is sent instructing that the polling interval should be changed based on the monitor information from the information display device.

Thus, according to the present embodiment, efficient polling is carried out by automatically setting the polling interval according to the status of the information display device or the information displayed by the information display device. Consequently, the monitoring device and the server can efficiently perform the monitoring and control of the information display device.

Figure 2:
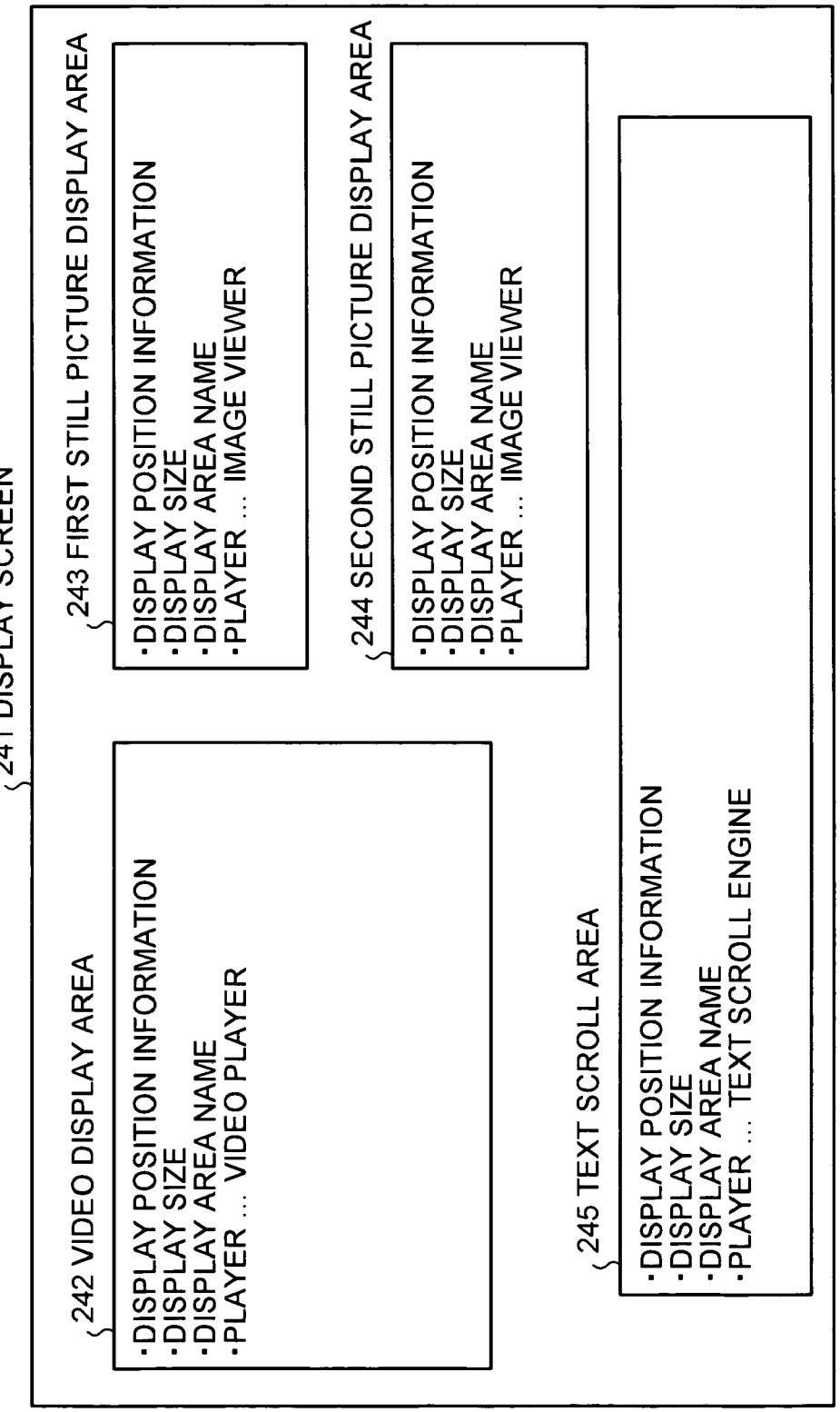
FIG. 2 is a drawing of data and control information files handled by the information delivery and display system.

Exemplary embodiments of the present invention are explained next with reference to FIG. 1 through FIG. 15. FIG. 1 and FIG. 2 are drawings of data and playback control information files handled by the information delivery and display system according to a first embodiment of the present invention.

FIG. 1 is a drawing of a structure of a presentation package 2, which is the largest unit of files handled by the information delivery and display system according to the present embodiment. The presentation package 2 includes a package information file 21, a menu file 22, an auto-presentation script 23, a plurality of presentation files 24-1 through 24-n, a plurality of material data 25-1 through 25-m, and a plurality of template files 26-1 through 26-k. The package information file 21, the menu file 22, the auto-presentation script 23, the presentation files 24-1 through 24-n, and the template files 26-1 through 26-k are the playback control information files that normally contain information for displaying programs having a plurality of material data (contents). The material data (contents) 25-1 through 25-m are the actual display data displayed by the operations of the playback control information files.

The material data 25-1 through 25-m are contents data used in the template files 26-1 through 26-k. The material data 25-1 through 25-m include video image file formats such as Moving Picture Experts Group (MPEG), animation Graphic Interchange Format (animation GIF), etc., still picture file formats such as Joint Photographic Coding Experts Group (JPEG), Portable Network Graphics (PNG), Graphic Interchange Format (GIF), Tagged Image File Format (TIFF), etc., audio file formats such as Musical Instruments Digital Interface (MIDI), MPEG Audio Layer-3 (MP3), Windows (R) Media Audio (WMA), and audio-video file formats such as Flash, text files, etc.

In the template files 26-1 through 26-k are defined information pertaining to display position that indicates one or more display areas (windows) for displaying each of the material data, the size of the display area, the player used for playing the material data in the display area, i.e., information pertaining to the association between each display area and the player for the display area, etc.

For instance, as shown in FIG. 2, assume an instance in which a display screen 241 displays a program that includes the following four display areas: a video display area 242 that displays MPEG files; a first still picture display area 243 that displays JPEG files; a second still picture display area 244 that displays PNG files; and a text scroll area 245 that displays text files.

The information pertaining to the video display area 242 defined in the template files includes the display position information, i.e., the display area name indicating the video display area 242, the size of the video display area 242, and the information pertaining to the association between the display area name of the video display area 242 and its player, which in this case is a video player.

The information pertaining to the first still picture display area 243 defined in the template files includes the display position information, i.e., the display area name indicating the first still picture display area 243, the size of the first still picture display area 243, and the information pertaining to the association between the display area name of the first still picture display area 243 and a player, which in this case is an image viewer.

The information pertaining to the second still picture display area 244 defined in the template files includes the display position information, i.e., the display area name indicating the second still picture display area 244, the size of the second still picture display area 244, and the information pertaining to the association between the display area name of the second still picture display area 244 and a player, which is also an image viewer.

The information pertaining to the text scroll area 245 defined in the template files includes the display position information, i.e., the display area name indicating the text scroll area 245, the size of the text scroll area 245, and the information pertaining to the association between the text scroll area 245 and a player (in this case, a text scroll engine).

By modifying the information defined in the template files, such as the display position of the display area, the size of the display area, and the association between the display area and the player, the layout of the display screen 241 can be easily changed. In other words, a plurality of template files having different definitions can be prepared in advance and different display layouts can be obtained depending on the template that is used. In addition, different programs can be created using the same template file merely by changing the material data to be displayed in each display area.

In each of the presentation files (program files) 24-1 through 24-n are defined a file name of one of the template files 26-1 through 26-k and the information pertaining to the correlation between one or more display areas (display area names) of the template file and one or more material data 25-1 through 25-m (file names). For example, in FIG. 2, assuming that the material data 25-1 is displayed in the video display area 242, the material data 25-2 is displayed in the first still picture display area 243, the material data 25-3 is displayed in the second still picture display area 244, and the material data 25-4 is displayed in the text scroll area, the information pertaining to these four correlations is defined in one presentation file 24-1. Thus, one presentation file corresponds to one program and all the presentation files 24-1 through 24-n are used in the file management of the material data 25-1 through 25-m and the template files 26-1 through 26-k.

In the menu file 22 are defined information pertaining to a definition of a menu screen that includes auto-playback buttons by which an information viewer can select any program from the plurality of programs (in other words, the presentation files 24-1 through 24-n) and a correlation between each of the auto-playback buttons (that is, the auto-playback button name) and the file name of the presentation file.

In the auto-presentation script 23 is defined information pertaining to a start time and a finish time, i.e., the display schedule, of each program. In other words, each presentation file name is defined and correlated to a start time and a finish time.

The file names of the menu file 22 and the auto-presentation script 23 are defined in the package information file 21. The package information file 21 is used in the management of the menu file 22 and the auto-presentation script 23.

The presentation files 24-1 through 24-n are managed by the menu file 22 and the auto-presentation script 23.

Figure 3:
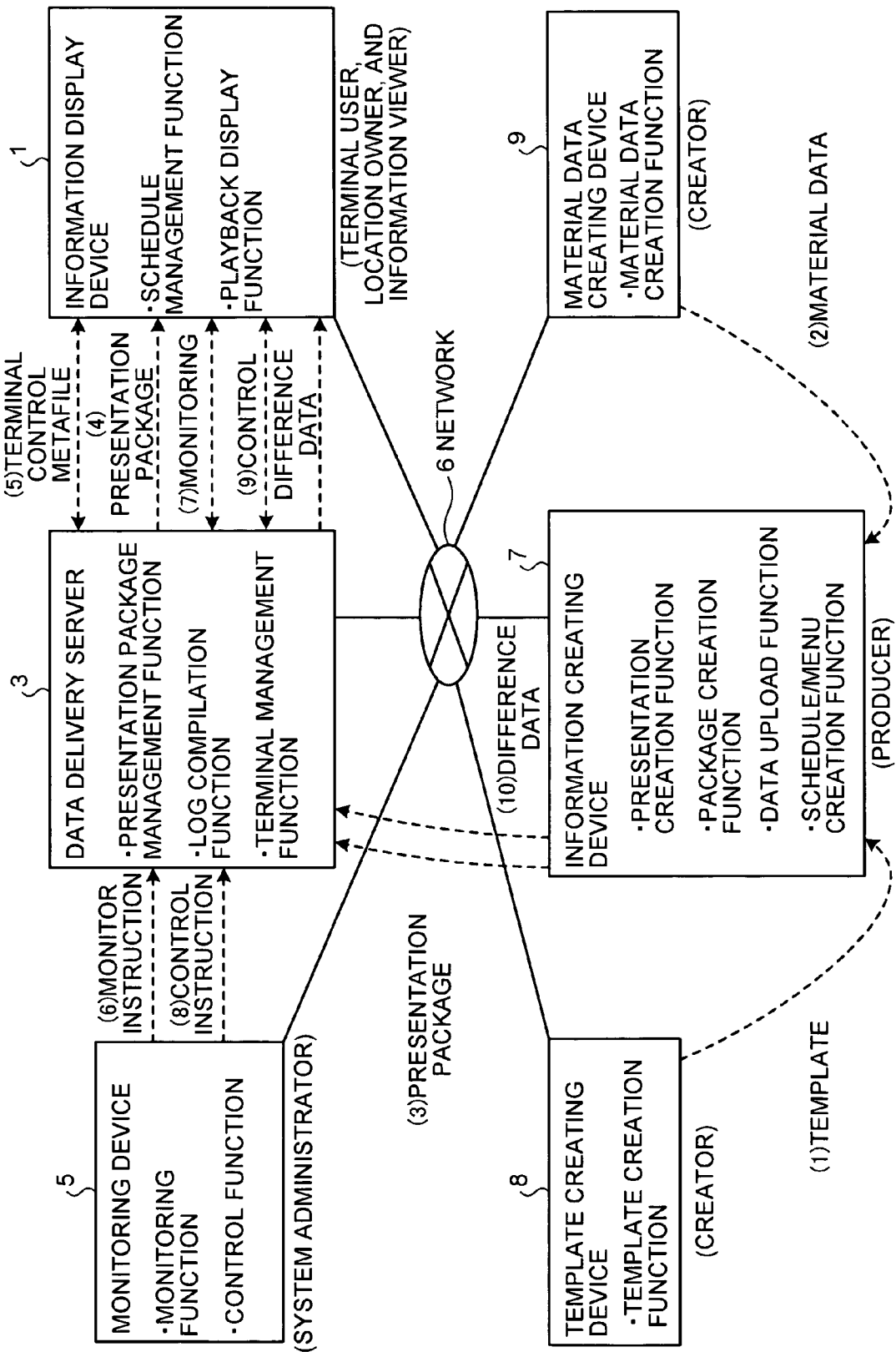
FIG. 3 is a system configuration of the information delivery and display system.

FIG. 3 is a system configuration of the information delivery and display system according to the first embodiment of the present invention. The information delivery and display system according to the first embodiment includes a material data creating device 9, a template creating device 8, an information creating device 7, a data delivery server (monitoring/control server) 3, a monitoring device 5, an information display device 1, and a network 6 such as the Internet that connects all the devices enabling mutual communication.

The material data creating device 9 is a personal computer or similar device on which a creator creates the material data 25-1 through 25-m and is provided with the functions for creating video files, still picture files, text files, and audio-video files.

The template creating device 8 is a personal computer or similar device on which the creator creates the template files 26-1 through 26-k and is provided with the functions for creating templates.

The information creating device 7 is a personal computer or similar device on which a producer creates programs. The information creating device 7 creates programs by creating all the files in the presentation package 2 shown in FIG. 1 using the various material data created using the material data creating device 9 and the template files created using the template creating device 8. The information creating device 7 sends the created presentation package to the data delivery server 3 via the network 6. The information creating device 7 is provided with a presentation creation function, a schedule menu creation function, a package creation function, and a data upload function.

The presentation creation function enables the producer to create a plurality of presentation files 24-1 through 24-n that correspond to a plurality of programs using the material data 25-1 through 25-m created by the material data creating device 9 and template files 26-1 through 26-k created by the template creating device 8. In particular, the producer defines, for each presentation file, a file name for one template file and the correlation between the one or more display areas (display area names) and one or more material data 25-1 through 25-m (file names) in the template file. Further, the presentation creation function displays the program by playing the material data using the template file defined in the presentation file, thus enabling the producer to verify the presentation file.

The schedule menu creation function determines, based on the information pertaining to the order of priority specified by the producer for displaying the presentation files, the display schedule for the programs defined in each presentation file created using the presentation creation function and creates the auto-presentation script 23 and the menu file 22.

Whenever the menu file 22, the auto-presentation script 23, or any one of the presentation files 24-1 through 24-n is created or modified, the package creation function creates the package information file 21 or changes the files in the package information file 21 by selecting the required menu file 22, auto-presentation script 23, or the presentation files 24-1 through 24-n.

The data upload function sends to the data delivery server 3 the presentation package 2 created by the package creation function via the network 6. The data upload function involves creating a plurality of packages containing one or more files from the plural files in the presentation package 2 in each package, encrypting each package, tagging package identification information to the encrypted packages, and sending the encrypted packages to the data delivery server 3. The package identification information includes information such as the presentation package name to which the package belongs and information pertaining to the contents of the files in the package, such as whether the files are new material data 25-1 through 25-6, are modified data of material data 25-1 through 25-8, are new presentation files 24-1 through 24-10, or is a menu file 22. A package represents a group of files that share the same encryption key.

When creating a package, the data upload function determines whether the target presentation package 2 is a new or an updated version. If determined to be an updated version, the data upload function creates and sends packages containing only the updated files. The packages are created to reduce the amount of data transferred during a single data communication. If the data amount is not particularly large, the presentation package 2 itself may be encrypted and sent.

The data delivery server 3 carries out monitoring and control of the information display device 1 based on a monitor instruction (monitor instruction information) and a control instruction (control instruction information) from the monitoring device 5. The data delivery server 3 is provided with a presentation package management function, a terminal management function, and a log compilation function.

The presentation package management function stores the package received from the information creating device 7 and determines from the package identification information whether the received package is one of the packages of a new presentation package 2 or a package of an existing presentation package 2 containing only updated files. If assessed to be a package containing only updated files, the presentation package management function decrypts the stored package and the package received from the information creating device 7, updates only the part (i.e., the files in the package received from the information creating device 7) of the old presentation package 2, repacks, encrypts, and stores the updated package. If assessed to be a package of a new presentation package 2, the presentation package management function waits until all the packages are received, converts them into a new presentation package 2, and stores the new presentation package 2.

The terminal management function is explained next. When the information display device 1 accesses the system for polling, based on the monitor instruction from the monitoring device 5, the terminal management function sends to the information display device 1 a send request (hereinafter, "monitor information send request") to send load information of the central processing unit (CPU) of the information display device 1 and information pertaining to the status of the information display device 1 such as temperature, etc. (hereinafter, "monitor information") of the display unit of the information display device 1. When the information display device 1 accesses the system for polling, based on the control instruction from the monitoring device 5, the terminal management function sends to the information display device 1 a download request to download the presentation package or the package, sends an instruction to switch to another of the plurality of presentation packs stored in the information display device 1, or sends an instruction to change the settings of the polling interval to confirm the instruction to switch to another presentation package, etc.

The log compilation function compiles and stores the monitor information received from the information display device 1. Every type of data stored by the log compilation function is available for inspection by the monitoring device 5.

The information display device 1 is a device that displays the programs created by the information creating device 7 and stores one or more presentation packs 2 obtained by decrypting packages or presentation packs 2 downloaded from the data delivery server 3. The information display device 1 is provided with a schedule management function and a playback display function.

The schedule management function manages the display schedule of the programs based on the auto-presentation script 23 of the presentation package 2. The schedule management function outputs to the playback display function a playback instruction that starts the playback and a stop instruction that stops the playback of the program. The schedule management function outputs the playback instruction either when the start time for the program defined in the auto-presentation script 23 has arrived or when the information viewer selects a program by clicking on a program selection button on a menu screen. The playback instruction includes the file name of the presentation files corresponding to the program to be played. The schedule management function outputs the stop instruction when the program is playing either when the finish time of the display specified in the auto-presentation script 23 has arrived or when the information viewer selects another program from the menu screen.

The schedule management function also enables switching between the plurality of presentation packs 2 stored in the information display device 1 based on the control instruction received from the monitoring device 5 via the data delivery server 3.

Figure 4:
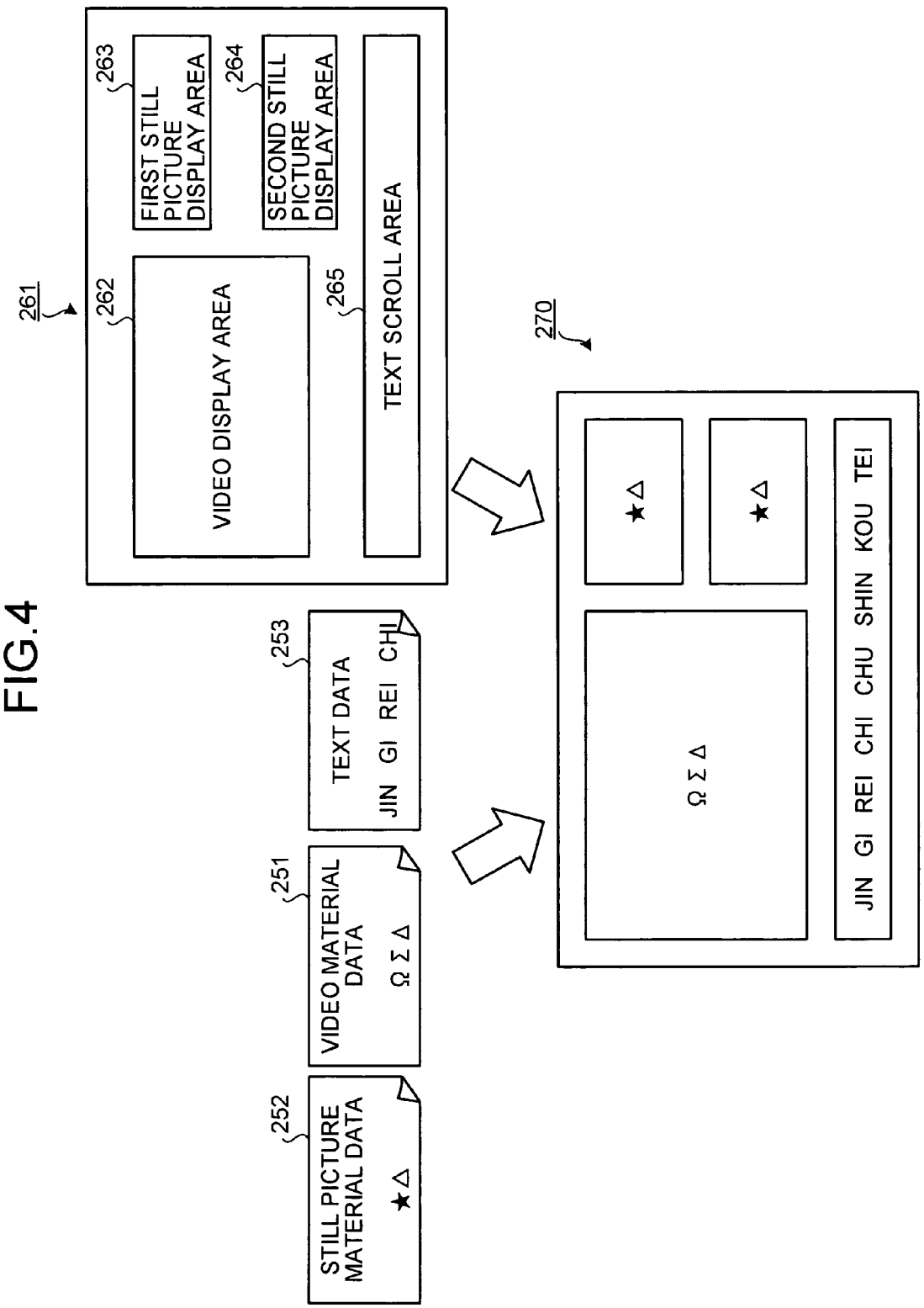
FIG. 4 is a drawing of steps for creation of a program.

The playback display function displays the program based on the presentation files included in the playback instruction. The playback display function displays the program by playing one or more material data correlated to one or more display areas of the template file defined in the presentation file with their respective players. For example, as shown in FIG. 4, a program 270 is created from a template file 261 in which are defined a video display area 262, still picture display areas 263 and 264, and a text scroll area 265, a video material data 251 correlated to the video display area 262, a still picture material data 252 correlated to the still picture display areas 263 and 264, and a text data 253 correlated to the text scroll area 265. The program 270 has a video display area 262 in which the video material data 251 is played by the correlated video player, the still picture display areas 263 and 264 in which the still pictures 253 are played by the correlated image viewer, and the text scroll area 265 in which the text data 253 is played by the text scroll engine. If no template file is defined in the presentation file, the playback display function displays the program using a stored default template file.

The monitoring device 5 is a personal computer that allows the system administrator to monitor and control the information display device 1 and is provided with a monitoring function and a control function. The monitoring function sends to the data delivery server 3 the monitor instruction to get monitor information from the information display device. The control function sends to the data delivery server 3 the control instructions to control the information display device 1 such as a download request of the presentation package 2 or the package, an instruction to switch to another presentation package 2, an instruction to change the settings of the polling interval, etc.

The information delivery and display system shown in FIG. 3 illustrates one device each of the template creating device 8, the material data creating device 9, and the information display device 1. However, there may be a plurality of template creating devices 8, material data creating devices 9, and information display devices 1.

A brief overview of the operation of the information delivery and display system according to the first embodiment of the present invention is explained next. The operations involved in displaying the program on the information display device 1 are explained first. The template creating device 8 sends the template files 26-1 through 26-k to the information creating device 7. Similarly, the material data creating device 9 sends the material data 25-1 through 25-m to the information creating device 7.

The information creating device 7 creates the files in the presentation package 2 shown in FIG. 1 using each type of the material data 25-1 through 25-m created by the material data creating device 9 and the template files 26-1 through 26-k created by the template creating device 8. The information creating device 7 sends the presentation package 2 created using the package creation function to the data delivery server 3 via the network 6.

The data delivery server 3 decrypts the received presentation package 2 or the package, encrypts it again, and stores it. The data delivery server 3 allows, based on the control instruction from the monitoring device 5, the downloading of the stored presentation package 2 or the package to the information display device 1.

The information display device 1 decrypts the presentation package 2 or the package downloaded from the data delivery server 3. Based on the auto-presentation script 23 or the menu file 22 in the presentation package 2, the information display device 1 plays the program by playing the material data using the template files defined in the presentation file of the program.

The operations involved in the monitoring of the information display device 1 from the monitoring device 5 are explained next. The information display device 1 accesses the data delivery server 3 for polling at predetermined time intervals. If there is a monitor instruction from the monitoring device 5 when the information display device 1 accesses the data delivery server 3, the data delivery server 3 sends a monitor information send request to the information display device 1. The information display device 1 sends the requested monitor information to the data delivery server 3. The data delivery server 3 receives and stores the monitor information and resets (clears) the monitor instruction from the monitoring device 5. In this way, the monitoring device 5 accesses the data delivery server 3 at predetermined time intervals and scans the monitor information stored in the data delivery server 3 to monitor the status of the information display device 1.

The operations involved in controlling the information display device 1 from the monitoring device 5 are explained next. The information display device 1 accesses the data delivery server 3 for polling at predetermined time intervals. If there is a control instruction from the monitoring device 5 when the information display device 1 accesses the data delivery server 3, the data delivery server 3 sends the control instruction to the information display device 1. The information display device 1 carries out the control based on the control request received from the data delivery server 3.

If the control instruction pertains to an instruction to download the presentation package 2 or the package, the information display device 1 requests from the data delivery server 3 the presentation package 2 or the package specified by the control instruction and downloads it. If the control instruction pertains to an instruction to switch to another presentation package 2, the information display device 1 uses the schedule management function to switch from the current presentation package 2 to the presentation package 2 specified by the control instruction. If the control instruction pertains to an instruction to set the polling interval, the information display device 1 sets the polling interval, which becomes valid the next time the information display device 1 accesses the data delivery server 3 for polling.

Communication is carried out through metafiles when the GET method of HTTP protocol is used in the communication protocol during polling of the data delivery server 3 by the information display device 1. In other words, the information display device 1 accesses the data delivery server 3 at a predetermined polling interval using the GET method of the HTTP protocol.

Figure 5:
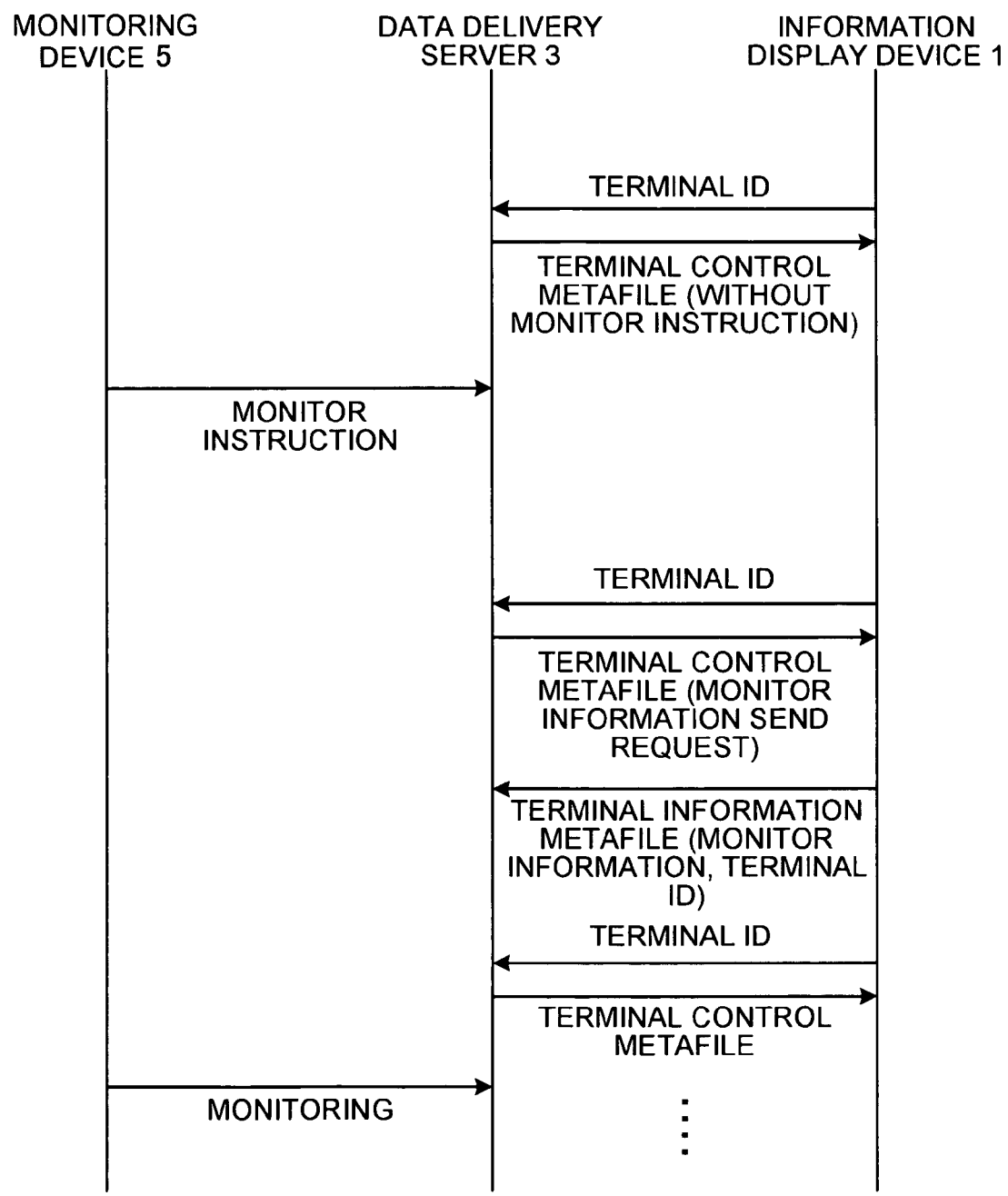
FIG. 5 is a sequence diagram of operations involved in monitoring the status of an information display device by a monitoring device.

FIG. 5 is a sequence diagram of the operations involved in monitoring the status of the information display device with the monitoring device. When the information display device 1 accesses the data delivery server 3, a terminal ID, which is a unique ID for every information display device 1, is tagged.

When the information display device 1 accesses the data delivery server 3, the data delivery server 3 sends the terminal control metafile to the information display device 1. The terminal control metafile includes files such as instruction files that control activities including switching between presentation packs 2, etc.

When the data delivery server 3 receives no monitor instruction from the monitoring device 5, it sends the terminal control metafile with no request for the monitor information (monitor item) to the information display device 1. When the information display device 1 receives the terminal control file with no request for the monitor information, it sends no monitor information to the data delivery server 3 until the next polling.

The monitoring device 5 implements a monitor instruction on the data delivery server 3 when it retrieves the monitor information from the information display device 1. When the data delivery server 3 receives the monitor instruction from the monitoring device 5, it sends to the information display device 1 the terminal control metafile that includes a monitor information send request and an address, such as the Uniform Resource Locator (URL) of the data delivery server 3, to which the monitor information is to be sent. The information display device 1 gets the requested monitor information, tags its own terminal ID to the monitor information, creates a terminal information metafile that contains the monitor information and the terminal ID, and sends it to the data delivery server 3. The data delivery server 3 compiles and stores the monitor information received from the information display device 1 and resets the monitor instruction from the monitoring device 5. The monitoring device 5 monitors the status of the information display device 1 as needed by inspecting the monitor information stored in the data delivery server 3.

Figure 6:
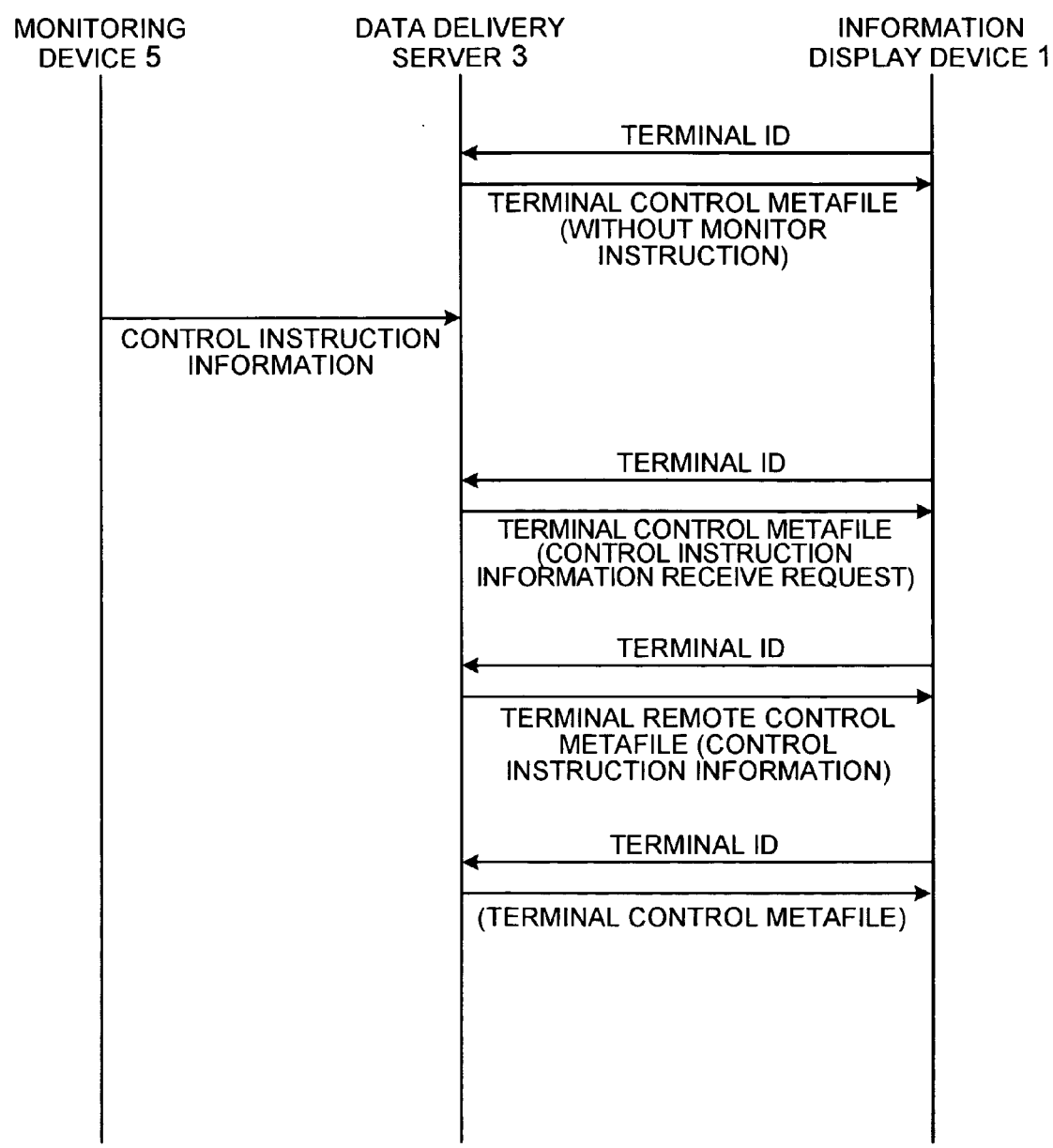
FIG. 6 is a sequence diagram of the operations involved in the control of the information display device by the monitoring device.

FIG. 6 is a sequence diagram of the operations involved in the control of the information display device by the monitoring device. When the information display device 1 accesses the data delivery server 3, a terminal ID (i.e., a unique ID for every information display device 1) is tagged.

When the information display device 1 accesses the data delivery server 3, the data delivery server 3 sends the terminal control metafile to the information display device 1. The terminal control metafile includes files such as instruction files that control activities including the switching between presentation packs 2, etc.

When the data delivery server 3 receives no control instruction from the monitoring device 5, it sends the terminal control metafile with no request for the control information to the information display device 1. When the information display device 1 receives the terminal control file with no request for the control information, it does not carry out any polling to receive the terminal remote control metafile.

The monitoring device 5 implements a control instruction on the data delivery server 3 as needed to control the information display device 1. When the data delivery server 3 receives the control instruction from the monitoring device 5, it sends to the information display device 1 the terminal control metafile that includes a terminal remote control metafile receive request (control instruction information receive request) and an address (i.e., the URL of the data delivery server 3) to which the control instruction information is to be sent.

Upon receiving the control instruction information receive request, the information display device 1 accesses the data delivery server 3 using the GET method of the HTTP protocol to receive the terminal remote control metafile. The accessing of the data delivery server 3 by the information display device 1 for receiving the terminal remote control metafile is distinct from accessing for polling at predetermined time intervals. The information display device 1 receives from the data delivery server 3 the terminal remote control metafile that includes the control instruction information based on which is carried out the control of the information display device 1. Further, the polling interval can be changed from the terminal remote control metafile of the data delivery server 3.

The monitoring device, the monitoring/control server, and the information display device, which are the relevant parts of the present invention and which are implemented in the information delivery and display system described above, are explained next.

Figure 7:
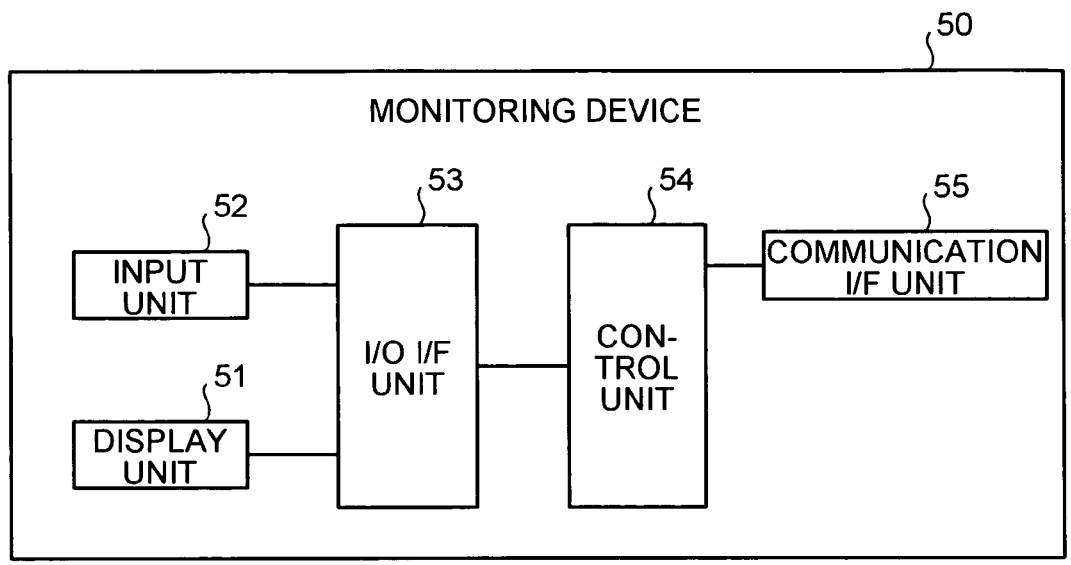
FIG. 7 is a block diagram of the monitoring device.
Figure 8:
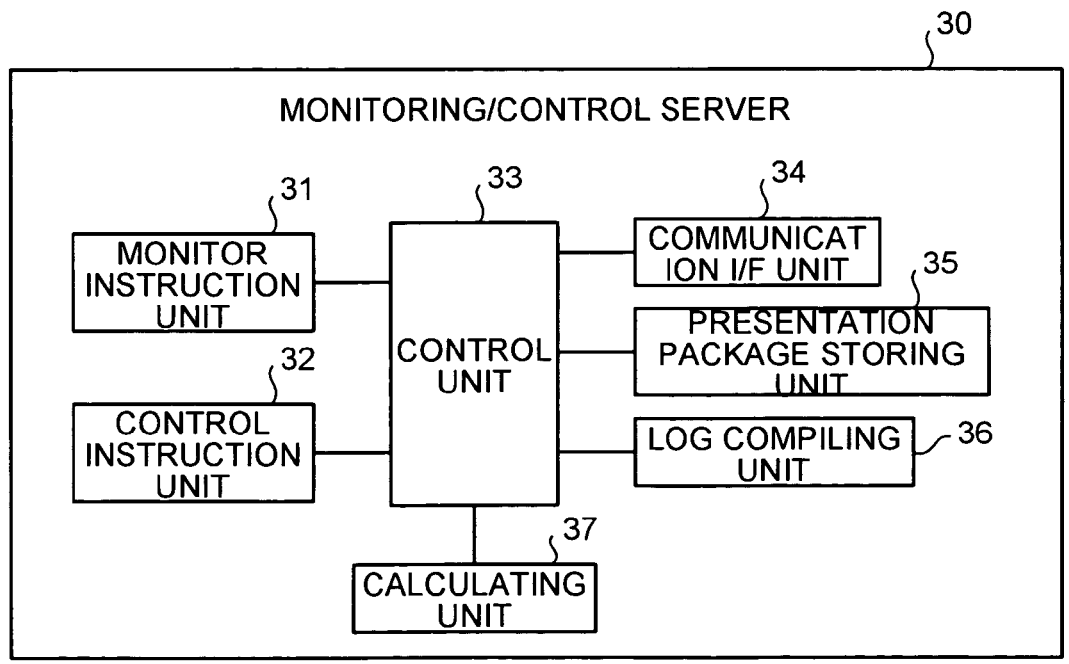
FIG. 8 is a block diagram of a monitoring/control server.
Figure 9:
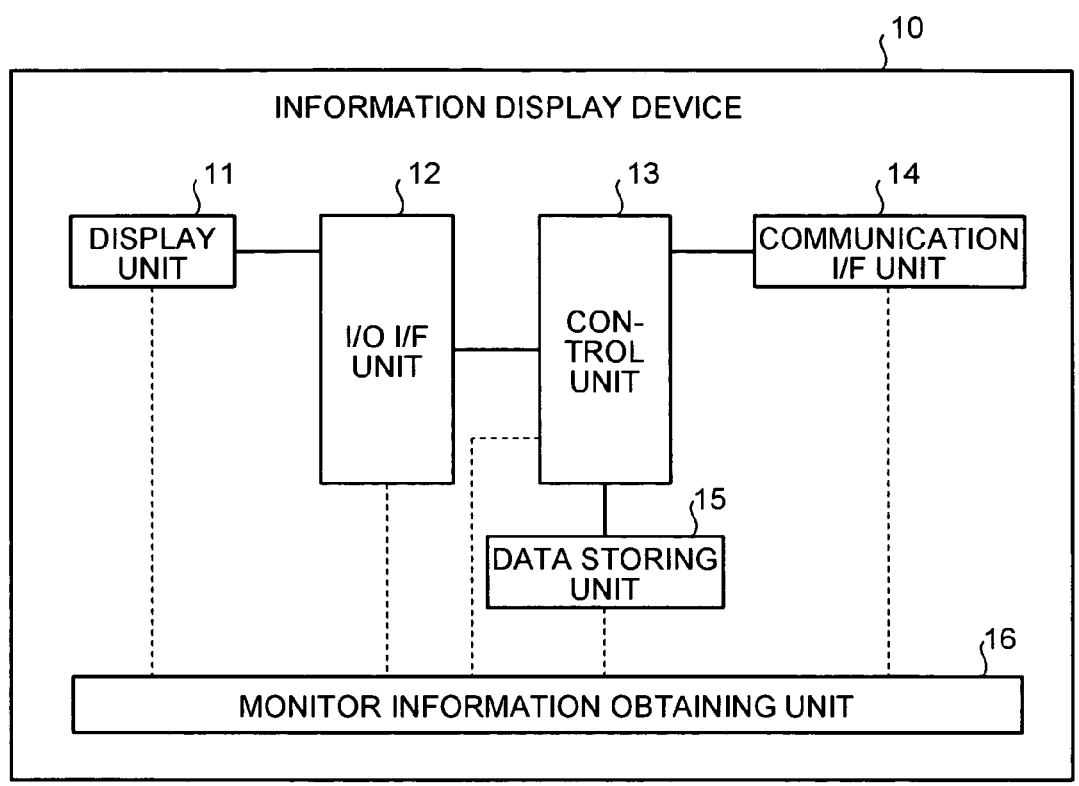
FIG. 9 is a block diagram of the information display device.

FIG. 7 is a block diagram of a monitoring device. A monitoring device 50 is applied to the monitoring device 5 of the information delivery and display system described above. FIG. 8 is a block diagram of a monitoring/control server. A monitoring control server 30 is applied to the data delivery server 3 of the information delivery and display system described above. FIG. 9 is a block diagram of an information display device. An information display device 10 can use the HTTP protocol as the communication protocol during polling.

The monitoring device 50 can be implemented as a personal computer by which the system administrator monitors and controls the information display device 10, etc, and includes an input unit 52, an input/output interface (I/O IF) unit 53, a control unit 54, and a communication interface (I/F) unit 55.

The display unit 51 displays as a browser the list of presentation packs stored in the monitoring/control server 30 and information pertaining to the state of the information display device 10 according to the monitor instruction. The display unit 51 can be a liquid crystal display panel, a plasma display device, or any device capable of displaying data and images.

The input unit 52 allows various kinds of information to be input. The input unit 52 can includes a mouse, a keyboard, etc. The input unit 52 accepts inputs such as instruction information required for retrieving monitor information (monitor instruction information) and instruction information required for controlling the information display device 10 (control instruction information) such as a request for downloading presentation packs or packages, etc. The input unit 52 also accepts input of a presentation package switching schedule used for changing the settings of the polling interval, for changing a minimum time for a polling interval (minimum polling interval Tmin), etc. The minimum polling interval Tmin is described later.

The monitoring instruction information is instruction information that the monitoring device 50 sends to the monitoring/control server 30. Based on the monitoring instruction information, the monitoring/control server 30 sends a monitor information send request in the form of a terminal control metafile to the information display device 10. The monitor information send request is a request to send monitor information to the information display device 10.

The control instruction information is instruction information that the monitoring device 50 sends to the monitoring/control server 30. Based on the control instruction information, the monitoring/control server 30 sends a control instruction information receive request in the form of a terminal control metafile to the information display device 10. The control request information receive request is a request to the information display device 10 to receive the control instruction information used for controlling the information display device.

The I/O I/F unit 53 is an interface that facilitates data input from the input unit 52 and data output to the display unit 53. The communication I/F unit 55 is an interface that facilitates sending to the monitoring/control server 30 monitor instruction information and control instruction information and receiving the list of presentation packs, monitor information, etc., stored in the monitoring/control server 30 via the network 6. The control unit controls the display unit 51, the input unit 52, the I/O I/F unit 53, the control unit 54, and the communication I/F unit 55.

The monitoring/control server 30 sends the terminal control metafile and the terminal remote control metafile to the information display device 10. The monitoring/control server 30 includes a monitor instruction unit 31, a control instruction unit 32, a control unit 33, a communication I/F unit 34, a presentation package storing unit 35, a log compiling unit 36, and a calculating unit 37.

Once the monitor instruction information is received from the monitoring device 50, and the information display device 10 accesses the monitoring/control server 30 for polling, the monitor instruction unit 31 sends, based on the monitor instruction information from the monitoring device 50, a monitor information send request in the form of a terminal control metafile to the information display device 10. The terminal control metafile includes monitor items corresponding to the monitor instruction information and the URL of the address to which the monitor information is to be sent (i.e., the URL of the monitoring/control server 30).

Once the control instruction information is received from the monitoring device 50, and the information display device 10 accesses the monitoring/control server 30 for polling, the control instruction unit 32 sends, based on the control instruction information from the monitoring device 50, a control instruction information receive request in the form of a terminal control metafile to the information display device 10. When the information display device 10 accesses the monitoring/control server 30 for polling, the control instruction unit 32 also sends a control instruction information receive request in the form of a terminal control metafile to the information display device 10 based on a polling interval calculated by the calculating unit 37. The terminal control metafile includes a terminal remote control metafile receive request and the URL of the control information provider (i.e., the monitoring/control server 30). The control instruction unit 32 converts to a terminal remote control metafile the control instruction issued by the monitoring unit 50 in response to the terminal remote control metafile receive request from the information display device 10.

The log compiling unit 36 compiles and stores the monitor information sent by the information display device 10. The monitoring device 50 can monitor all data stored by the log compiling unit 36. The communication I/F unit 34 is an interface that facilitates receiving the monitor instruction information and control instruction information from the monitoring device 50 and packages from the information creating device 7, etc. The communication interface I/F unit 34 also sends, monitor information send request, control instruction information receive request, the packages, the presentation packs, control instruction information, etc. to the information display device 10 via the network 6.

The presentation package storing unit 35 stores packages received from the information creating unit 7 by converting them to presentation packs or encrypting them and stores a presentation package list. The presentation package storing unit 35 also stores information pertaining to the presentation package switching schedule received from the monitoring device 50, the minimum polling interval Tmin, and other relevant information. Information pertaining to the display start time and display end time of each presentation package is defined in the presentation package switching schedule. In other words, the display schedule of each presentation package is defined in the presentation package switching schedule. That is, one presentation package name is associated with one display start time and one display end time. The minimum polling interval Tmin is a time setting required for comparison when the polling interval is automatically set. The polling interval can be changed only when the polling interval is shorter than the minimum polling interval Tmin. Otherwise, the polling is carried out at the minimum polling interval Tmin. Polling can be made to take place at least once during playback of a presentation package by setting a shorter minimum polling interval Tmin than the playback interval of the presentation package.

The calculating unit 37 calculates an optimum polling interval for the information display device 10 to access the monitoring/control server 30 based on the presentation package switching schedule and the minimum polling interval Tmin stored in the presentation package storing unit 35. The calculating unit 37 also calculates different setting conditions of the information display device 10 based on the data pertaining to the information display device 10 stored in the log compiling unit 36 and the content (file format of the material data) of the information played by the information display device 10. The control unit 33 controls the monitor instruction unit 31, the control instruction unit 32, the communication I/F unit 34, the presentation package storing unit 35, the log compiling unit 36, and the calculating unit 37.

The information display device 10 displays the program created by the information creating device 7 and includes a display unit 11, an I/O I/F unit 12, a control unit 13, a communication I/F unit 14, a data storing unit 15, and a monitoring information obtaining unit 16, as shown in FIG. 9.

The display unit 11 displays programs based on the auto-presentation script 23 or when a button on a menu screen is selected. The display unit can be implemented, for example, as a liquid crystal display panel, plasma display device, or other device capable of displaying programs.

The I/O I/F unit 12 is an interface that facilitates data output to the display unit 11. The communication I/F unit 14 is an interface that facilitates receiving the monitor information send request, the control instruction information receive request, packages, presentation packs, control instruction information, and other relevant information from the monitoring/control server 30. The communication I/F unit 14 also sends the monitor information corresponding to the monitor information send request to the monitoring/control server 30 via the network 6. The communication I/F unit 14 accesses the monitoring/control server 30 at a predetermined polling interval and receives the terminal control metafile of a monitor information send request, control instruction information receive request, and other relevant information. Upon receiving from the monitoring/control server 30 a control instruction information receive request (terminal control metafile), the I/O I/F unit 12 accesses the monitoring/control server 30 to receive the control instruction information (terminal remote control metafile).

The data storing unit 15 stores one or more presentation packs by decrypting the package or the presentation package received (downloaded) from the monitoring/control server 30. The monitor information obtaining unit 16 gets the corresponding monitor information upon receiving a monitor information receive request from the monitoring/control server 30. The control unit 13 controls the display unit 11, the I/O I/F unit 12, the communication I/F unit 14, the data storing unit 15, and the monitor information obtaining unit 16.

The information delivery and display system shown in FIG. 3 illustrates a system having one each of the monitoring device 5 and the information display device 1. However, it is possible for the system to have a plurality of monitoring device 50 and a plurality of information display device 10.

FIG. 10 is a flow chart of a process of auto-adjustment of the polling interval based on the monitor information. The information display device 10 accesses the monitoring/control server 30 at a predetermined polling interval t1 to check if there is a monitor information send request or a control instruction information receive request. When accessing the monitoring/control server 30, the information display device 10 carries out polling by tagging the terminal ID. Upon being accessed by the information display device 10, the monitoring/control server 30 sends the terminal control metafile to the information display device 10. If the terminal control metafile contains a monitor information send request, the information display device 10 sends the monitor information in the form of a terminal information metafile to the monitoring/control server 30 (Step S100). The monitoring/control server 30 gets the monitor information.

FIG. 11 is a drawing of an example of the contents of the terminal control metafile. The terminal control metafile is defined by segregating information into categories including basic information, package start information, log control information, terminal information, and terminal remote control information.

The basic information is information pertaining to the basic information about the file and includes 'Language type' of the metafile, 'Metafile creation date,' which indicates the date of creation of the metafile, and 'Metafile loading completion notifying URL,' which indicates the URL for notifying the completion of metafile loading.

The package start information is information pertaining to the playback of the presentation package and includes 'Package start date,' which indicates the date and time for staring the playback of the presentation package, 'Switching properties,' which indicates the switching method of the presentation packs, and 'Package ID' for identification of the presentation package. 'Switching properties' is information that indicates whether to wait until the current program is over to play the next program or to interrupt the current program to play the next program. 'Switching properties' also allows specification of how the presentation packs are to be played, such as menu-driven or schedule playback, which is playback by an auto-presentation script. The presentation package switching schedule function can be implemented by including a plurality of package start information in the terminal control metafile.

The log control information includes 'Get log request' that requests for log information (e.g., display history, date, error details, etc.) to be displayed during information display on the information display device 10. The terminal information includes 'Terminal information metafile request ID,' which identifies the contents of the terminal information metafile send request, and 'Terminal information metafile destination URL,' which indicates the URL of the destination (e.g., monitoring/control server 30, etc.) to which the terminal information metafile is to be sent.

The terminal remote control information includes 'Terminal remote control metafile request ID,' which identifies the contents of the terminal remote control metafile send request, 'Terminal remote control metafile receiver URL,' which indicates the URL of the receiver (e.g., monitoring/control server 30, etc.) of the terminal remote control metafile, and 'Terminal remote control metafile checksum.'

Upon receiving a new monitor instruction information from the monitoring device 50, the monitoring/control server 30 tags the new terminal information metafile request ID to the terminal control metafile (monitor information send request), and sends the terminal control metafile to the information display device 10. If no new monitor instruction information is received from the monitoring device 50, the monitoring/control server 30 sends the terminal control metafile (monitor information send request) attached with the previous terminal information metafile request ID attached to the information display device 10.

Upon identifying the monitor information send request as a new one from the terminal information metafile request ID tagged to the received terminal control metafile, the information display device 10 retrieves the monitor information and sends the monitor information as the terminal information metafile to the monitoring/control server 30.

The log compiling unit 36 of the monitoring/control server 30 stores and compiles the received terminal information metafile (monitor information), and the calculating unit 37 determines whether the value of the monitor information is within a predetermined range (Step S110).

FIG. 12 is a drawing of an example of the contents of the terminal information metafile. The terminal information metafile is defined by segregating information into categories including basic information, hardware information (monitor information) pertaining to hardware to be monitored, settings information, and miscellaneous information.

The basic information includes 'Language type' and 'Metafile creation date.' Hardware information pertains to a hard disk drive (HDD) device of the information display device 10 and includes 'OS name' indicating the operating system (OS) being used in the HDD device, 'CPU name,' 'CPU clock frequency,' 'Total memory size,' 'Total HDD capacity,' 'Free HDD capacity,' 'Video card name,' 'Resolution,' 'Sound card name,' 'Monitor name (monitor temperature),' 'Peripheral device (port no., device name),' 'Control application name,' 'Display application name,' and 'CPU load ratio.'

The settings information is information pertaining to the settings of the information display device 10 and includes: 'Package request URL,' which indicates the address of the destination (downloading party) to which the package (presentation package) is to be sent; 'Terminal control metafile request URL,' which indicates the address of the destination to which the terminal control metafile request is to be sent; 'Information delivery log URL,' which indicates the address to which the log obtained when downloading the package is to be sent; 'Program playback log URL,' which indicates the address to which the log obtained during program playback is to be sent; 'Package request polling interval (seconds),' which indicates the polling interval at which the information display device 10 downloads the presentation package by polling; 'Terminal control metafile polling interval (seconds),' which indicates the polling interval at which request for the terminal control metafile is sent; 'Download retry interval (seconds),' which indicates the interval up to which downloading of a package can be attempted; 'No. of download retries,' which indicates the number of times downloading of a package can be attempted; 'No. of threads (No. of files) to be downloaded at one time;' 'Log file sending interval (seconds);' 'Simple Network Time Protocol (SNTP) corrected period (seconds);' 'SNTP implementing server;' 'Timeout for idle menu;' 'Application update verification URL;' and 'Default program verification URL.' Miscellaneous information includes, for example, 'Terminal start up date (Day, month, year, hour, minute, second, geographical zone).'

When the calculating unit 37 of the monitoring/control server 30 determines that the monitor information for the information display device 10 stored in the log compiling unit 36 is not within the predetermined range ('No' in Step S110), and when the information display device 10 next accesses the monitoring/control server 30 for polling, the control instruction unit 32 includes the control instruction information receive request in the terminal control metafile and sends it to the information display device 10. When the information display device 10 accesses the monitoring/control server 30 for polling in response to the control instruction information receive request, the monitoring/control server 30 sends the terminal remote control metafile (control instruction information) to the information display device 10 to change the polling interval (Step S120).

FIG. 13 is a drawing of an example of the contents of the terminal remote control metafile. The terminal remote control metafile is defined by segregating information into categories including basic information, settings information, and control information. The basic information includes 'Language type' and 'Metafile creation date.'

The settings information is identical to the settings information of the terminal information metafile and includes 'Package request URL,' 'Terminal control metafile request URL,' 'Information delivery log URL,' 'Program playback log URL,' 'Package request polling interval (seconds),' 'Terminal control metafile polling interval (seconds),' 'Download retry interval (seconds),' 'No. of download retries,' 'No. of threads (No. of files) to be downloaded at one time,' 'Log file sending period (seconds),' 'Simple Network Time Protocol (SNTP) corrected period (seconds),' 'SNTP implementing server,' 'Timeout for idle menu,' 'Application update verification URL,' and 'Default program verification URL.' Miscellaneous information includes 'Terminal start up date (Day, month, year, hour, minute, second, and geographical zone).'

The control information pertains to settings related to, for example, the power status of the information display device 10 and includes 'Reboot terminal (seconds),' which indicates the time until rebooting of the information display device 10 when there is a reboot instruction, and 'Shutdown terminal (seconds),' which indicates the time until the information display device 10 is shutdown when there is a shutdown instruction.

For instance, if the load on the CPU is heavy according to the hardware information (monitor information) included in the terminal information metafile, the control instruction unit 32 sends to the information display device 10 a terminal remote control metafile in which an instruction for a longer polling interval is set to reduce the load on the CPU due to polling by the information display device 10.

The control instruction unit 32 may not only change polling interval based on the monitor information stored in the long compiling unit 36, but also based on the file format of the log file obtained during program playback or based on the file format of the information (material data) included in the presentation package being played by the information display device 10. For instance, if there are numerous playback display errors (e.g., if the number of errors is greater than a predetermined value) of the information display device 10 included in the log file, the control instruction unit 32 sends to the information display device 10 a terminal remote control metafile in which an instruction for a longer polling interval is set to reduce the load on the CPU due to polling by the information display device 10. Since the load on the CPU goes up if the material data of the information (program) played by the information display device 10 is in the MPEG format, the control instruction unit 32 sends to the information display device 10 a terminal remote control metafile in which an instruction for a longer polling interval is set to reduce the load on the CPU due to polling by the information display device 10. The control instruction unit 32 retrieves the log during program playback from the log compiling unit 36. Moreover, the control instruction unit 32 retrieves the file format of the information being played by the information display device 10 either from the presentation package switching schedule stored in the presentation package storing unit 35 or from the presentation files.

When monitoring and controlling a large number of information display devices 10, and when the polling interval of the remote information display devices 10 is short, the monitoring/control server 30 sends a terminal remote control metafile in which an instruction for a longer polling interval is set to the information display devices 10.

The monitoring/control server 30 issues the control instruction not only to change the polling interval, but also either to reduce the temperature of the monitor when the monitor of the information display device 10 gets very hot or to reboot the information display device 10 when there are too many display errors of the information in the log file.

Figure 14:
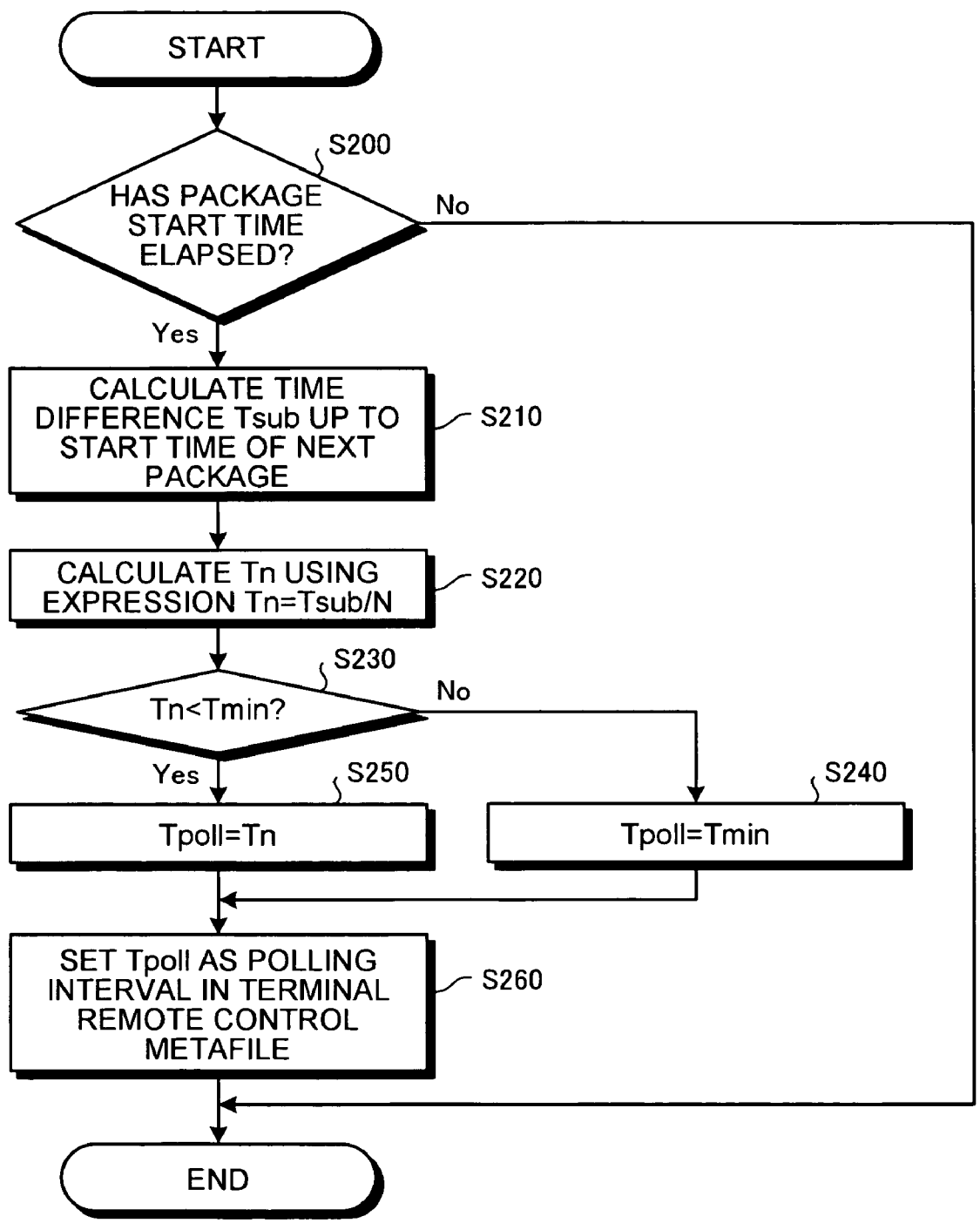
FIG. 14 is a flow chart of a process of auto-adjustment of the polling interval by the monitoring/control device.

FIG. 14 is a flow chart of a process of auto-adjustment of the polling interval by the monitoring/control server. A shorter minimum polling interval Tmin than the presentation package playback interval is set beforehand so that polling takes place at least once during the playback of the presentation package. The control instruction unit 32 of the monitoring/control server 30 checks, based on the presentation package switching schedule, whether the time for the information display device 10 to begin playing a predetermined presentation package (x-th) has elapsed (Step S200).

If the time for the information display 10 device to begin playing the x-th presentation package has elapsed ('Yes' in Step S200), then the calculating unit 37 carries out the playback of the x-th presentation package and calculates, based on the presentation package switching schedule, a interval Tsub up to the time for the information display device 10 to begin playing the next presentation package ((x+1)-th) (Step S210). The calculating unit 37 calculates a prospective polling interval Tn to change the polling interval during the playback of the x-th presentation package. The calculating unit obtains the prospective polling interval Tn by dividing Tsub by a predetermined value N such as 2, 3, etc., using the formula Tn=Tsub/N (Step S220).

The calculating unit 37 compares the minimum polling interval Tmin set beforehand and the prospective polling interval Tn (Step S230). If Tn≧Tmin ('No' in Step S230), then the calculating unit 37 considers a playback polling interval Tpoll, which is the polling interval during the playback of the x-th presentation package, as Tmin (Step S240). In other words, the calculating unit 37 takes Tpoll to be equal to Tmin. If Tn<Tmin ('Yes' in Step S230), then the calculating unit 37 takes the playback polling interval Tpoll as Tn, i.e., the calculating unit 37 takes Tpoll to be equal to Tn (Step S250).

When the information display device 10 next accesses the monitoring/control server 30 for polling, the monitoring/control server 30 includes the control instruction information receive request in the terminal control metafile and sends it to the information display device 10. When the information display device 10 accesses the monitoring/control server 30 for polling in response to the control instruction information receive request, the monitoring/control server 30 sends the terminal remote control metafile with the polling interval ('Terminal control metafile polling interval') as Tpoll determined in Steps S240 or S250 to the information display device 10.

Thus, by making the information display device 10 access the monitoring/control server 30 for polling at least once during the playback of each presentation package, it is possible to auto-adjust the polling interval using the access for polling. Further, since the prospective polling interval Tn is obtained by dividing Tsub by a predetermined value N, polling can be made to take place about N times even if the playback interval of the presentation package is short. Further, by setting Tpoll=Tmin under the condition Tn≧Tmin, the polling interval is changed only when the polling interval is shorter than the minimum polling interval Tmin. Consequently, the polling interval never exceeds the minimum polling interval Tmin even if auto-adjustment of the polling interval takes place.

Further, by sending the control instruction information receive request in the form of a terminal control metafile and sending the control instruction information in the form of a terminal remote control metafile, polling at predetermined time intervals can be carried out without loading the CPU even if the size of the control instruction information files is big. Consequently, a stable polling can be carried out at the predetermined polling interval. Further, the structure of the information delivery and display system is simplified by making the polling of the terminal control metafile and the polling of the control instruction information into two independent entities.

The auto-adjustment of the polling interval may be carried out when the monitoring device 50 sends a changed presentation package switching schedule. After the monitoring device 50 sends the changed presentation package switching schedule, when no polling by the information display device 10 takes place during the playback of the current presentation package (x-th), polling takes places during the playback of the next presentation package ((x+1)-th). Consequently, auto-adjustment of the polling interval takes place during the playback of the (x+1)-th presentation package. In this instance, the calculating unit calculates, based on the presentation package switching schedule, the interval Tsub up to the time when the information display device 10 begins to play the next presentation package ((x+2)-th), and further calculates Tn and Tpoll.

Figure 15:
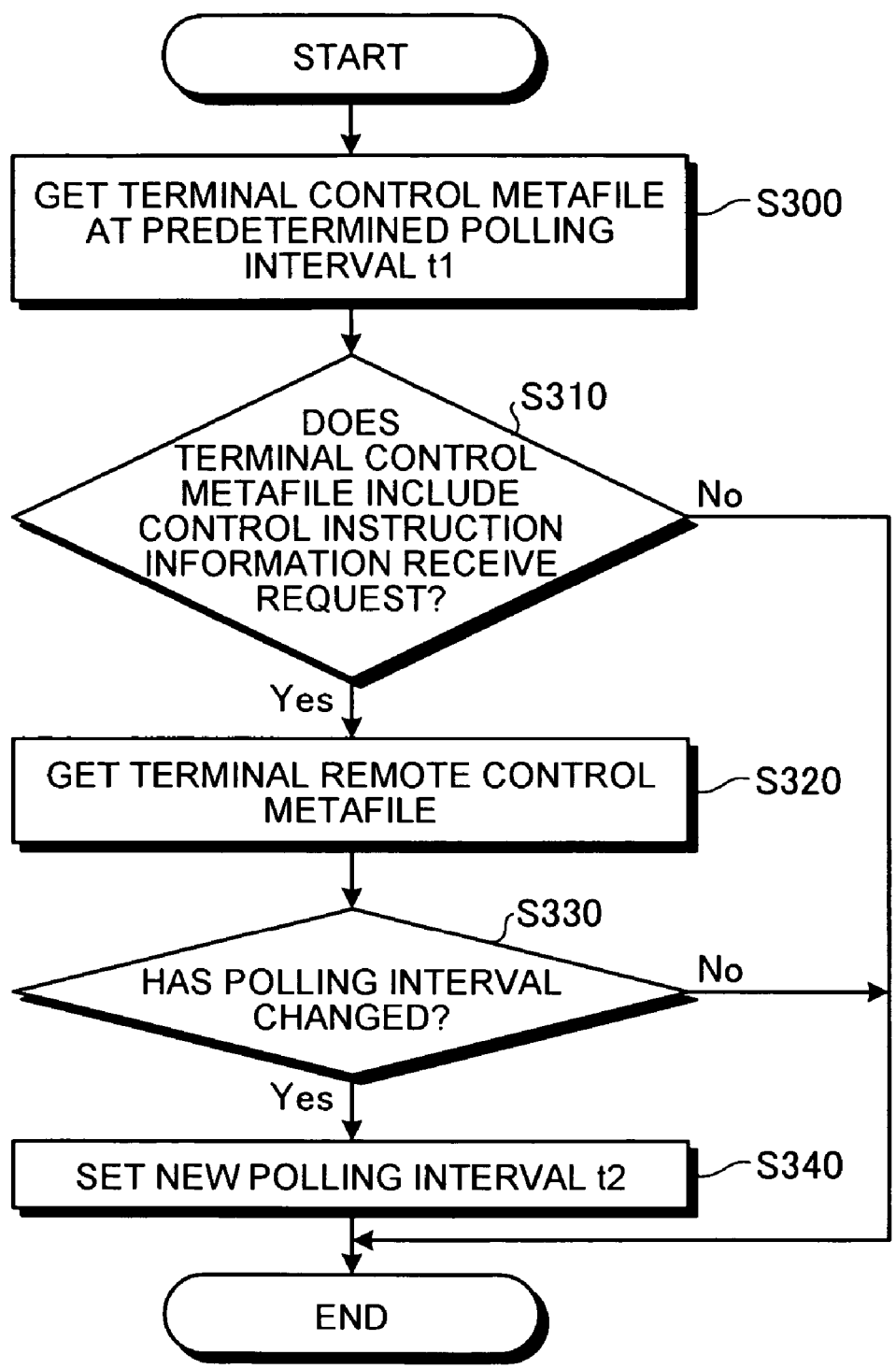
FIG. 15 is a flow chart of a process of changing the polling interval of the information display device.

FIG. 15 is a flow chart of a process of changing the polling interval of the information display device. The information display device 10 gets the terminal control metafile from the monitoring/control server 30 at a predetermined polling interval t1 (Step S300).

The information display device 10 checks whether the terminal control metafile includes a control instruction information receive request, for example, by determining if a new terminal information metafile request ID is tagged to the terminal control metafile (Step S310). If the terminal control metafile does not include a control instruction information receive request ('No' in Step S310), the information display device 10 continues to get the terminal control metafile from the monitoring/control server 30 at the polling interval t1. If the terminal control metafile includes a control instruction information receive request ('Yes' in Step S310), the information display device 10 accesses the monitoring/control server 30 and receives control instruction information (i.e., the terminal remote control metafile) from the monitoring/control server 30 (Step S320).

The information display device 10 checks whether the setting of the polling interval t1 ('Terminal control metafile polling interval') in the received terminal remote control metafile has changed (Step S330). If the setting of the polling interval t1 has not changed ('No' in Step S330), the information display device 10 continues to get the terminal control metafile from the monitoring/control server 30. If the setting of the polling interval t1 has changed, for instance to t2, etc. ('Yes' in Step S330), the information display device 10 changes the setting of the polling interval so as to get the terminal control metafile from the monitoring/control server 30 at the polling interval t2 (Step S340).

Once the polling interval is changed according to the instruction in the terminal remote control metafile, the information display device 10 may send to the monitoring/control server 30 a notification (process result) indicating that the change in the polling interval has been implemented. The process result sent by the information display device 10 may be stored by the monitoring/control server 30 and viewed on the monitoring device 50.

In the present embodiment, the monitoring/control server 30 first sends the terminal control metafile (control instruction information receive request) and then the terminal remote control metafile (control instruction) to the information display device 10. However, the control instruction may also be sent through the terminal control metafile. By doing so, it is possible to reduce the frequency of sending and receiving metafiles between the monitoring/control server 30 and the information display device 10, which results in speeding up the sending/receiving response.

Further, in the present embodiment, the monitoring/control server 30 sends to the information display device 10 a control instruction for downloading of packages based on the control instruction information from the monitoring device 30. However, the information display device 10 may carry out polling of the monitoring/control server 30 at predetermined intervals and download whenever a new package can be downloaded. Consequently, polling for checking for a control instruction information receive request or a monitor information send request and polling for downloading packages can be carried out independently of each other. Thus, the structure of the information delivery and display system can be simplified.

In the present embodiment, the package start information, log control information, terminal information, and terminal remote control information are sent through the terminal control metafile. However, each type of information may be obtained separately by polling. In other words, polling for obtaining the package start information, polling for obtaining the log control information, polling for obtaining the terminal information, and polling for obtaining the remote control information may be carried out independently. Thus, the structure of the information delivery and display system can be simplified.

To sum up, the information display device 10 does not need a global internet provider (IP) because the monitoring/control server 30 monitors and controls the information display device 10 by a pull method by issuing a monitor instruction and a control instruction, which the information display device 10 obtains from the monitoring/control server 30 by polling. Though in the communication protocol such as HTTP the firewall can be easily crossed, security can be enhanced since the information display device 10 does not require a server function. Further, polling is carried out efficiently since the polling interval is set according to the status of the information display device 10 or the contents of the material data being played by the information display device 10. Further, when the monitoring/control server 30 monitors and controls a large number of information display devices 10 or when the polling interval of the remote information display devices 10 is short, the polling interval is increased to reduce the load on the monitoring/control server 30. Further, the polling interval is changed only when the polling interval is shorter than the minimum polling interval Tmin. Consequently, the polling interval never exceeds the minimum polling interval Tmin even if auto-adjustment of the polling interval takes place and polling takes place efficiently. Consequently, the monitoring device 50 and monitoring/control server 30 can monitor and control the information display device 10 efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information delivery and display system comprising:
    an information display device that plays display information; and
    an information delivery server that sends information to the information display device when the information display device carries out polling at a predetermined time interval,
    wherein the information delivery server includes a control instruction unit that creates control instruction information to change a polling interval of the information display device based on a content of the display information to be displayed by the information display device or a status of the information display device, and that sends the control instruction information to the information display device when the information display device carries out polling.

2. The information delivery and display system according to claim 1, wherein the control instruction unit creates the control instruction information based on a schedule of playing the display information of display information packs sequentially on the information display device, and wherein the display information packs include a plurality of different display information and control information to play the display information.

3. The information delivery and display system according to claim 2, wherein the information delivery server further includes a calculating unit that calculates as the polling interval either a minimum polling interval or a interval obtained by dividing a playback interval of one of the display information packs set in the schedule by a predetermined value, and wherein the control instruction unit creates the control instruction information based on a calculation result of the calculating unit.

4. The information delivery and display system according to claim 2, wherein the information delivery server changes the polling interval either when one of the display information packs starts or when there is a change in the schedule.

5. The information delivery and display system according to claim 1, wherein the control instruction unit creates the control instruction information based on a file format of the display information of one display information package.

6. The information delivery and display system according to claim 1, further comprising:

a monitoring device that instructs the information delivery server, wherein the information delivery server further includes a monitor instruction unit that creates monitor instruction information to send monitor information to the information display device when an instruction issued by the monitor device is a monitor information request to monitor the status of the information display device, and wherein the control instruction unit creates the control instruction information based on the monitor information from the information display device.

7. The information delivery and display system according to claim 1, wherein the control instruction unit sends the control instruction information to the information display device when the information display device carries out polling at the predetermined time interval.

8. The information delivery and display system according to claim 1, wherein the control instruction unit sends to the information display device instruction information to receive the control instruction information and, when the information display device carries out polling to receive the control instruction information, sends the control instruction information to the information display device.

9. The information delivery and display system according to claim 1, further comprising:

a plurality of information display devices that play display information.

10. An information delivery and display system comprising:

an information display device that plays display information; and an information delivery server that sends information to the information display device when the information display device carries out polling at a predetermined time interval, wherein the information delivery server causes a change in the polling interval of the information display device based on a load on the information delivery server, and wherein the load depends on a number of remote information display devices and/or the polling interval of the remote information display devices.

11. An information delivery method for sending information from an information delivery server to an information display device when the information display device carries out polling at a predetermined time interval, the information delivery method comprising:

obtaining, by the information delivery server, information pertaining to a content of display information to be displayed by the information display device or a status of the information display device;

creating, by the information delivery server, control instruction information to change a polling interval of the information display device based on the information pertaining to the content of the display information to be displayed by the information display device or the status of the information display device; and sending, by the information delivery server, the created control instruction information to the information display device when the information display device carries out polling.

* * * * *